(12) United States Patent
Smith et al.

(10) Patent No.: US 11,435,781 B1
(45) Date of Patent: Sep. 6, 2022

(54) COMPUTING DEVICE

(71) Applicant: Lenovo (Singapore) Pte. Ltd., Singapore (SG)

(72) Inventors: Madison Smith, Santa Rosa, CA (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/210,367

(22) Filed: Mar. 23, 2021

(51) Int. Cl.
*G06F 1/16* (2006.01)

(52) U.S. Cl.
CPC .......... *G06F 1/1618* (2013.01); *G06F 1/1656* (2013.01); *G06F 1/1671* (2013.01); *G06F 1/1681* (2013.01); *G06F 1/1686* (2013.01)

(58) Field of Classification Search
CPC .......................... G06F 1/1686; H04M 1/0264
See application file for complete search history.

(56) References Cited

U.S. PATENT DOCUMENTS

| | | | | |
|---|---|---|---|---|
| 8,913,170 B1 * | 12/2014 | Baldwin | ............... | G06F 1/1686 348/333.01 |
| 9,692,953 B2 * | 6/2017 | Xiong | ................. | H04M 1/0264 |
| 9,736,383 B2 * | 8/2017 | Evans | ..................... | G02B 13/06 |
| 10,021,296 B2 * | 7/2018 | Fan | ....................... | H04N 5/2251 |
| 10,101,777 B1 * | 10/2018 | Tucker | ................. | H04N 5/2257 |
| 10,218,942 B2 * | 2/2019 | Tucker | ............... | H04N 5/23293 |
| 10,444,802 B2 * | 10/2019 | Zeng | .................... | H04M 1/0235 |
| D888,700 S * | 6/2020 | Huang | ......................... | D14/248 |
| 10,806,042 B2 * | 10/2020 | Zeng | ........................ | H01F 7/06 |
| 10,880,419 B2 * | 12/2020 | Gong | ........................ | H04M 1/0208 |
| 10,893,177 B2 * | 1/2021 | Tsai | ....................... | H04N 5/2256 |
| 10,924,643 B2 * | 2/2021 | Xu | ........................ | H04M 1/0264 |
| 10,938,969 B2 * | 3/2021 | Li | ........................ | F16M 11/046 |
| 11,057,506 B2 * | 7/2021 | Zeng | ........................ | H04M 1/18 |
| 11,140,249 B2 * | 10/2021 | Chen | ........................ | H04N 5/2252 |
| 2005/0014527 A1 * | 1/2005 | Chambers | ............ | H04N 5/2354 455/556.1 |
| 2012/0105400 A1 * | 5/2012 | Mathew | ................ | G06F 1/1686 345/207 |
| 2012/0194997 A1 * | 8/2012 | McClure | ............... | G06F 1/1698 361/679.55 |
| 2015/0163382 A1 * | 6/2015 | Kwong | .................. | G06F 1/1637 348/375 |
| 2017/0064054 A1 * | 3/2017 | Lombardi | ............ | H04N 5/2253 |
| 2017/0094038 A1 * | 3/2017 | Chen | ..................... | H04N 5/2257 |
| 2018/0262663 A1 * | 9/2018 | Zhang | ................. | H04M 1/0264 |
| 2018/0292866 A1 * | 10/2018 | Tucker | ................. | G06F 1/1686 |
| 2018/0295328 A1 * | 10/2018 | Tucker | ............... | H04N 5/23293 |
| 2019/0138062 A1 * | 5/2019 | Zeng | .................. | H04M 1/0264 |
| 2020/0092447 A1 * | 3/2020 | Fletcher | .................... | G06T 7/55 |
| 2020/0191368 A1 * | 6/2020 | Reed | ........................ | F21V 21/26 |
| 2021/0026404 A1 * | 1/2021 | Hong | .................. | H01L 51/5253 |

* cited by examiner

*Primary Examiner* — Adrian S Wilson
(74) *Attorney, Agent, or Firm* — Brian J. Pangrle

(57) ABSTRACT

A computing device can include a processor; memory accessible to the processor; a display panel operatively coupled to the processor; a housing that includes a protective layer that covers the display panel; and a camera assembly mounted to an edge of the housing, where the camera assembly includes a camera, a camera aperture and a recess, where the protective layer covers the camera aperture and extends into the recess.

18 Claims, 12 Drawing Sheets

COMPUTING DEVICE

TECHNICAL FIELD

Subject matter disclosed herein generally relates to technology for computing systems or other systems.

BACKGROUND

Various types of systems, display systems, computing and display systems, etc. exist that have one or more cameras for image capture.

SUMMARY

A computing device can include a processor; memory accessible to the processor; a display panel operatively coupled to the processor; a housing that includes a protective layer that covers the display panel; and a camera assembly mounted to an edge of the housing, where the camera assembly includes a camera, a camera aperture and a recess, where the protective layer covers the camera aperture and extends into the recess. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
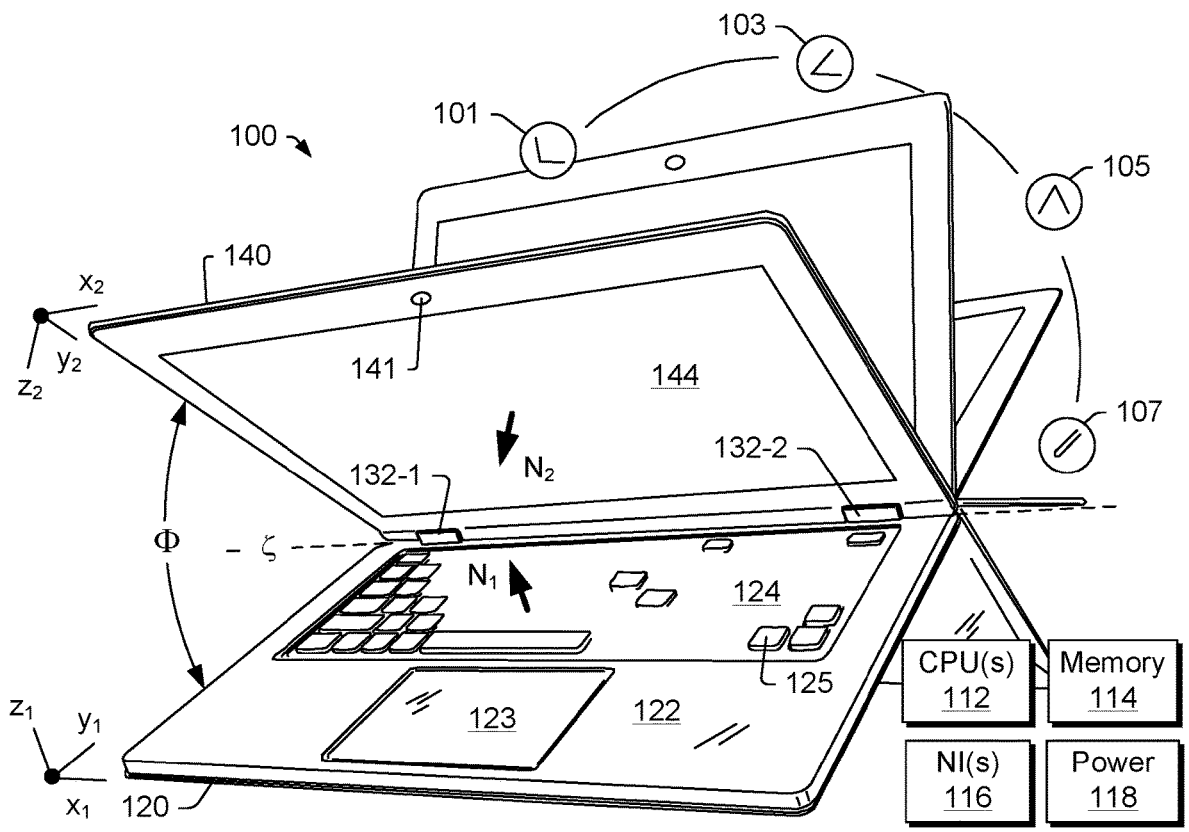
FIG. 1 is a diagram of an example of a computing device.
Figure 1:
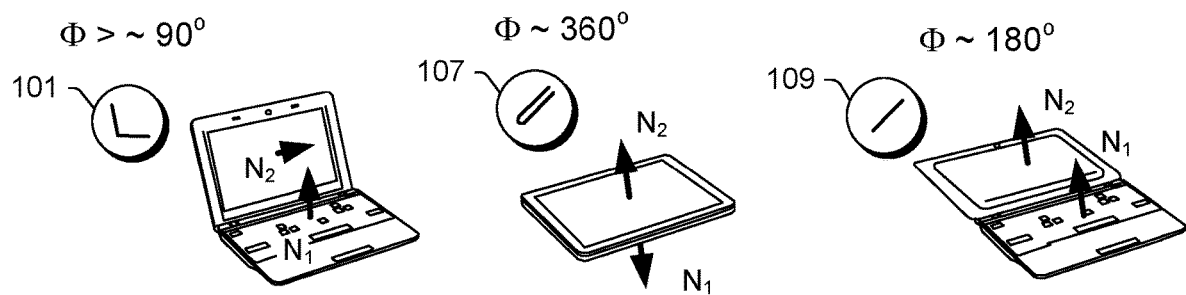

FIG. 1 shows an example of a computing device 100 that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the users hand or hands. A user may perceive the springiness of the keys 125 as being somewhat undesirable. For example, springy keys may interfere with a user's ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
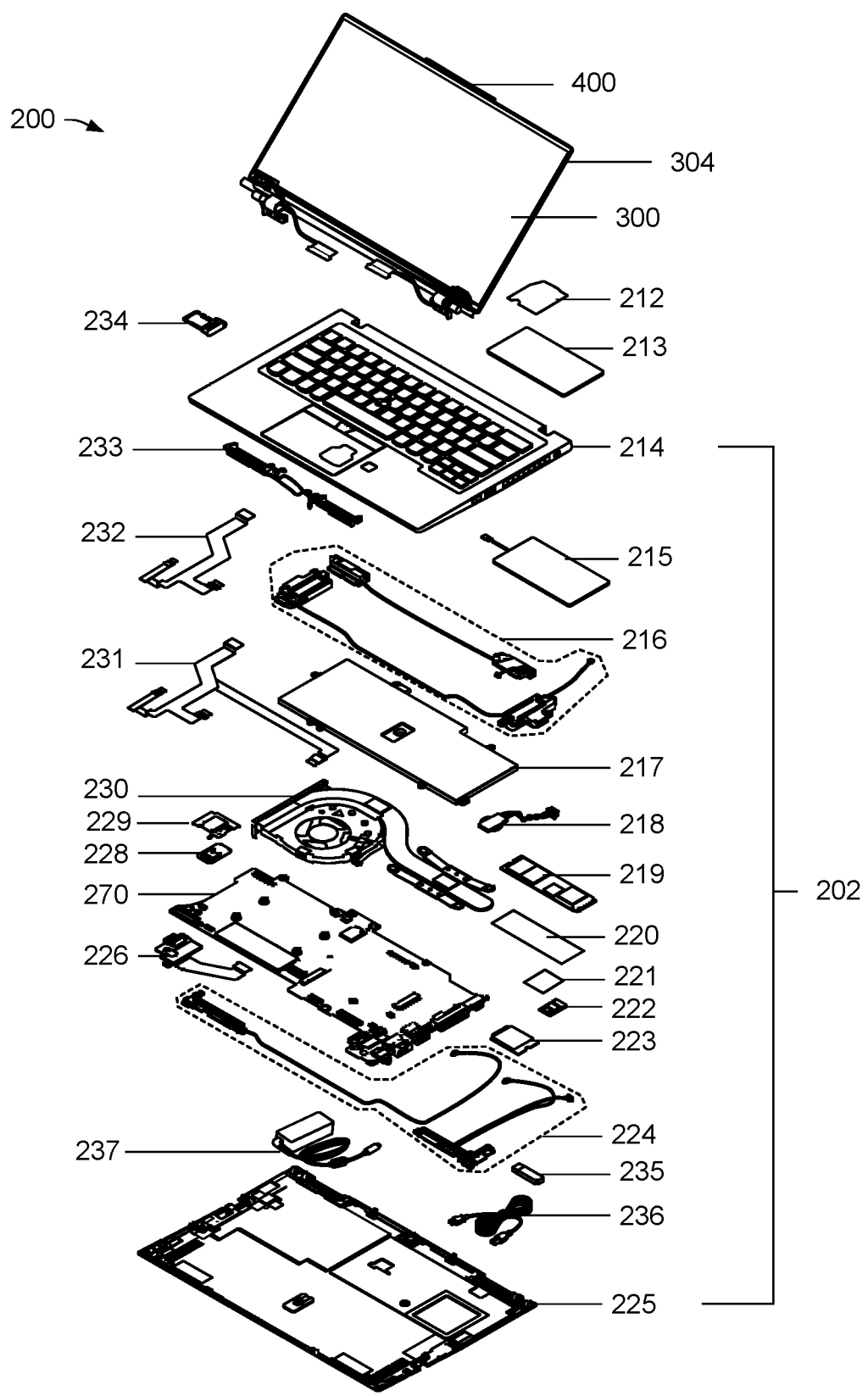
FIG. 2 is a diagram of an example of a computing device or computing system.

FIG. 2 shows an exploded perspective view of a computing system 200 as including various components, which can include, for example, a display assembly 300, a camera assembly 400, insulation trackpad tape 212, a trackpad 213 or 215, a keyboard bezel assembly with keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237. As an example, the computing device 100 of FIG. 1 can include one or more of the features of the computing device 200 of FIG. 2.

Figure 3:
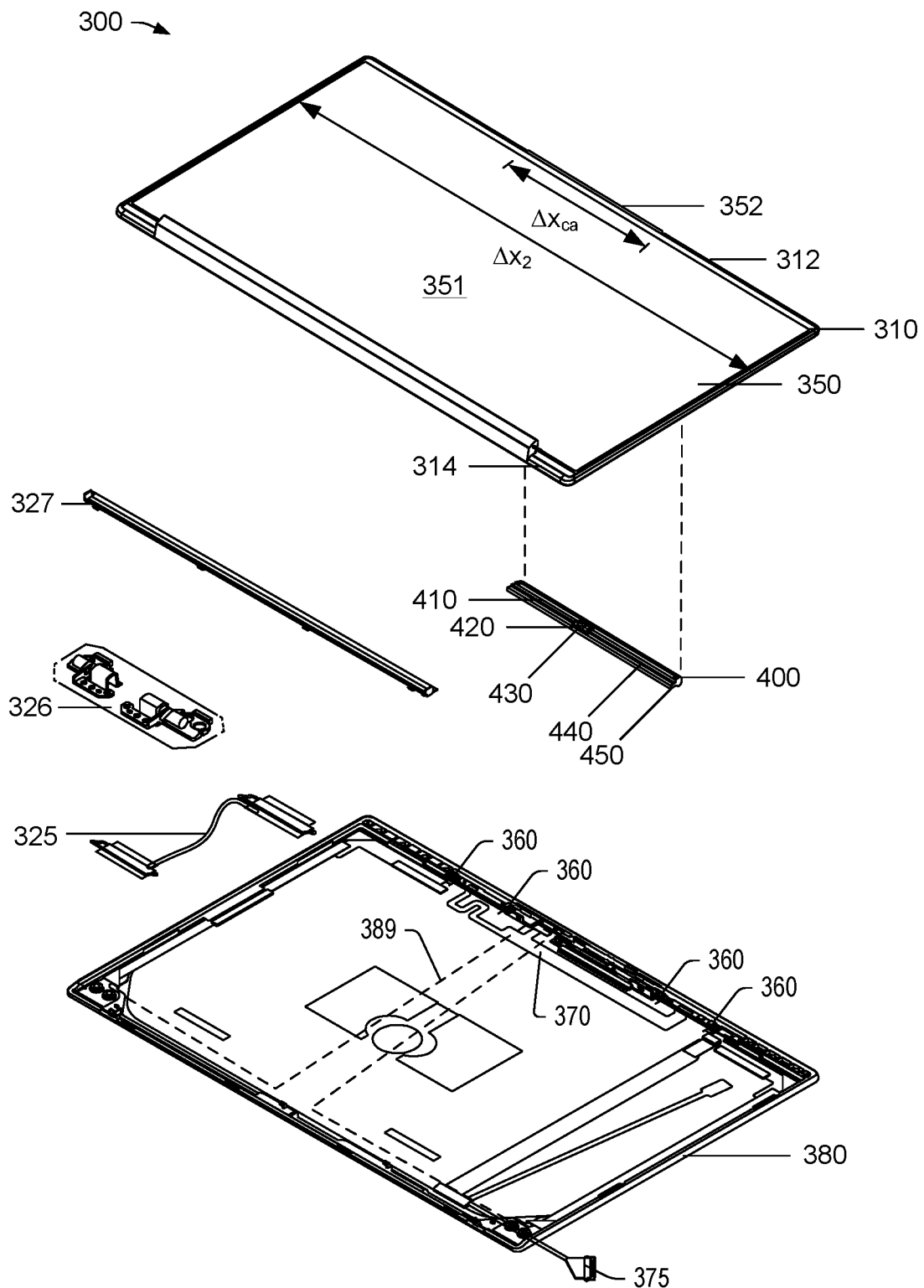
FIG. 3 is a diagram of an example of a display assembly of the computing device or computing system of FIG. 2.

FIG. 3 shows an exploded perspective view of the display assembly 300 of FIG. 2 as including the camera assembly 400 and various components, which can include, for example, a bezel 310, a display panel 350, one or more microphones 360, wiring 370, one or more wiring connectors 375, a back side (rear) cover assembly 380, a display cable 325, hinge assemblies 326, and a display bezel frame component 327. In the example of FIG. 3, the display assembly 300 may include one or more rigid support members 389, which may, for example, extend between one or more of the hinge assemblies 326 to the camera assembly 400. In such an example, a user may move the display assembly 300 using the camera assembly 400 as a grip where force may be carried by the one or more rigid support members 389 in a manner that may reduce risk of distorting the display panel 350. In such an example, the display assembly 300 may be made thinner with adequate integrity to reduce risk of damage to the display panel 350 as may occur with a thin display assembly where a user grips the thin display assembly at a corner, which may result in uneven distribution of force across a display panel, which can depend on distance from the corner to a hinge assembly or hinge assemblies. For example, the one or more rigid support members 389 may help to more evenly distribute force with respect to a hinge assembly or hinge assemblies such that risk of twisting a display panel (e.g., out of a plane) is reduced.

In the example of FIG. 2 and FIG. 3, the computing system 200 can include various media capture components. For example, a camera can be a media capture component, a microphone can be a media capture component, etc. A media capture component may be an audio media capture component, a video media capture component, a still image media capture component, etc. In the example of FIG. 2 and FIG. 3, the camera assembly 400 can include one or more media capture components, which can include one or more cameras, one or more microphones, etc. As an example, the camera assembly 400 can include a visible light camera and optionally an infrared light camera (IR camera). As an example, the camera assembly 400 may include one or more rangefinder circuits, laser circuits, etc.

As an example, the camera assembly 400 can include one or more lights, which, as explained can include one or more of different types of lights (e.g., face illumination light(s), flash illumination light(s), status illumination light(s), etc.). As an example, a light may be a light emitting diode (LED) or light emitting diode array (LED array). As an example, one or more light pipes may be included in the camera assembly 400 and/or otherwise included in the display assembly 300. For example, a light pipe may be positioned proximate to one or more LEDs such that emissions of an LED can be transmitted via the light pipe. As an example, a light pipe may be a ceramic material, a polymeric material, a composite material, etc.

As shown in FIG. 3, the bezel 310 includes a top edge 312 and a bottom edge 314 and the display panel 350 includes a cover material 351 where a portion 352 of the cover material 351 extends a distance that may extend to or beyond the top edge 312. In the example of FIG. 3, the camera assembly 400 includes a recess 410 that can receive the portion 352 of the cover material 351. In such an example, the portion 352 can cover and protect one or more components of the camera assembly 400. For example, consider a camera aperture and/or a camera lens 420 of a visible light camera 430 that can be covered by the portion 352. As an example, a camera lens such as the camera lens 420 may define an aperture (e.g., a lens aperture, etc.). As an example, the camera assembly 400 can include one or more interfaces 440 such that circuitry of the camera assembly 400 can be operatively coupled to circuitry of the computing system 200. For example, consider a power interface and/or a data interface. In such an example, the camera assembly 400 can receive power and at least transmit data such as imagery data to other circuitry of the computing system 200.

In the example of FIG. 3, the display assembly 300 is shown as having a width $\Delta x_2$ where the camera assembly 400 can occupy a portion of that width, denoted $\Delta x_{ca}$. As an example, the width $\Delta x_{ca}$ may be approximately 10 percent to approximately 50 percent of the width $\Delta x_2$. For example, in the example of FIG. 3, the width $\Delta x_{ca}$ is approximately 30 percent of the width $\Delta x_2$. In such an example, a user may be able to grasp a portion of the camera assembly 400 using a thumb on a first side and a forefinger and middle finger on an opposing, second side (e.g., or three fingers). As an example, a width range for a camera assembly with respect to a width of a display assembly may be 10 percent to 70 percent, 15 percent to 50 percent, 15 percent to 40 percent, or 20 percent to 40 percent.

In the example of FIG. 3, the camera assembly 400 may provide a user with an enhanced experience. For example, consider a look and feel akin to a semi-luxury or luxury handbag, purse or clutch purse (e.g. MANSUR GAVRIEL, NORDSTROM, etc.) that can include a central metal clasp that may be fixed to one side or a central metal clasp interlocking design with a portion fixed to each of two opposing sides. As an example, a camera assembly can include an exterior surface that may be a metallic surface (e.g., metal or alloy) that may withstand wear more readily than a surface of a cover or a bezel of a display housing. In such an example, a user may become accustomed to transitioning the display housing by contacting the metallic surface such that lesser wear occurs for other surfaces of the display housing. As explained, gripping at a more central position can be better than gripping at a corner when it comes to stresses that a display panel may experience upon transitioning of a display housing that includes the display panel.

As an example, a display housing may include one or more magnets and a keyboard housing may include one or more magnets where the magnets may interact to attract each other. In such an example, the display housing may include a camera assembly that includes one or more magnets where a corresponding position on a keyboard housing includes one or more corresponding magnets and/or ferromagnetic material. As an example, a camera assembly of a display housing may include a ferromagnetic material where a keyboard housing includes one or more magnets such that when the camera assembly approaches the one or more magnets an attractive force can act to maintain the display housing and the keyboard housing in a closed position.

As shown, the camera assembly 400 couples to the display assembly 300 at or proximate to the bezel 310. In such an example, the wiring 370 may operatively couples to the camera assembly 400. The display assembly 300 can be operatively coupled to other circuitry of the computing device 100, for example, via the one or more wiring connectors 375. As an example, a portion 450 of the camera assembly 400 can be positioned over a portion of the cover assembly 380. For example, the portion 450 of the camera assembly 400 can be visible from the back side of the display assembly 300 where it may extend over a back side of the cover assembly 380.

In the example of FIG. 3, various components of the display assembly 300 can form a housing 304 (see, e.g., FIG. 2), which may be referred to as a display housing, where the camera assembly 400 is coupled to the display housing 304. In the example of FIG. 2, various components can form a housing 202, which may be referred to as a keyboard housing, where the housing 202 may be coupled to the housing 304 via one or more hinge assemblies, etc. For example, the computing device 200 can include a first housing 202 coupled to a second housing 304 via one or more hinge assemblies (see, e.g., the hinge assemblies 326, etc.).

A camera assembly such as, for example, the camera assembly 400, may provide for a thinner display housing. For example, the display housing 304 may be made thinner by utilizing a thicker camera assembly. As an example, a display housing may be augmented with a thicker camera assembly that can accommodate one or more features that may not be available with a camera unit that fits between opposing surfaces of the display housing. As an example, the camera assembly 400 may include one or more front facing cameras and may include one or more rear facing cameras. As explained, the camera assembly 400 may include at least one camera and one or more other features.

As explained, a between the sides approach to a display housing camera can be limited to thickness of the display housing. As notebooks, desktops, monitors, and tablets are getting thinner and bezels getting smaller, which can be driven by user demand, the between the sides approach to a camera can result in compromises as to camera quality, which can be counter to user desires for having a higher quality camera.

Given trends toward increased use of remote work, mobile work and video conferencing, lighter and/or thinner computers with better cameras are increasingly beneficial. As explained with respect to the example of FIG. 2 and FIG. 3, a camera assembly such as the camera assembly 400 can provide a lighter and/or thinner computer with an acceptable quality camera. Additionally, such an approach may include one or more additional features such as, for example, one or more video conferencing features and/or one or more security features (e.g., privacy, etc.).

As an example, a camera assembly approach can provide a high quality conferencing experience, notification system, and camera shutter privacy with suitable computer thinness. Such an example may provide, for example, one or more of face lighting to improve a user's conferencing experience, status lighting to notify others that a user is in a video conference, and a security mechanism that assures that a camera cannot capture images when a user so desires. As to face lighting, it may be via one or more light emitting elements integrated into a camera assembly such that forward directed face lighting can be utilized to highlight a user's face during a video call. As to status lighting, a backward directed status light may provide an indication to others that the user is in a video call where the backward directed status light may be visible or not visible to the user (e.g., to reduce risk of distraction, etc.).

Figure 4A:
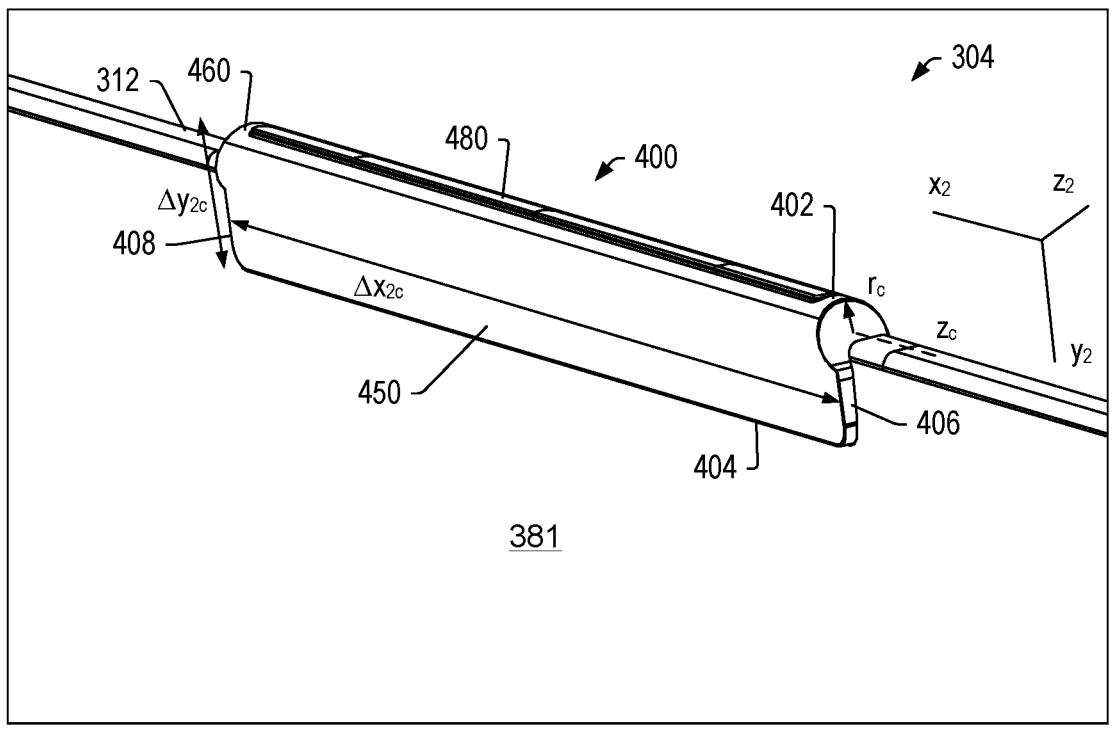
FIG. 4A and FIG. 4B are perspective views of an example of a housing and a camera assembly.
Figure 4B:
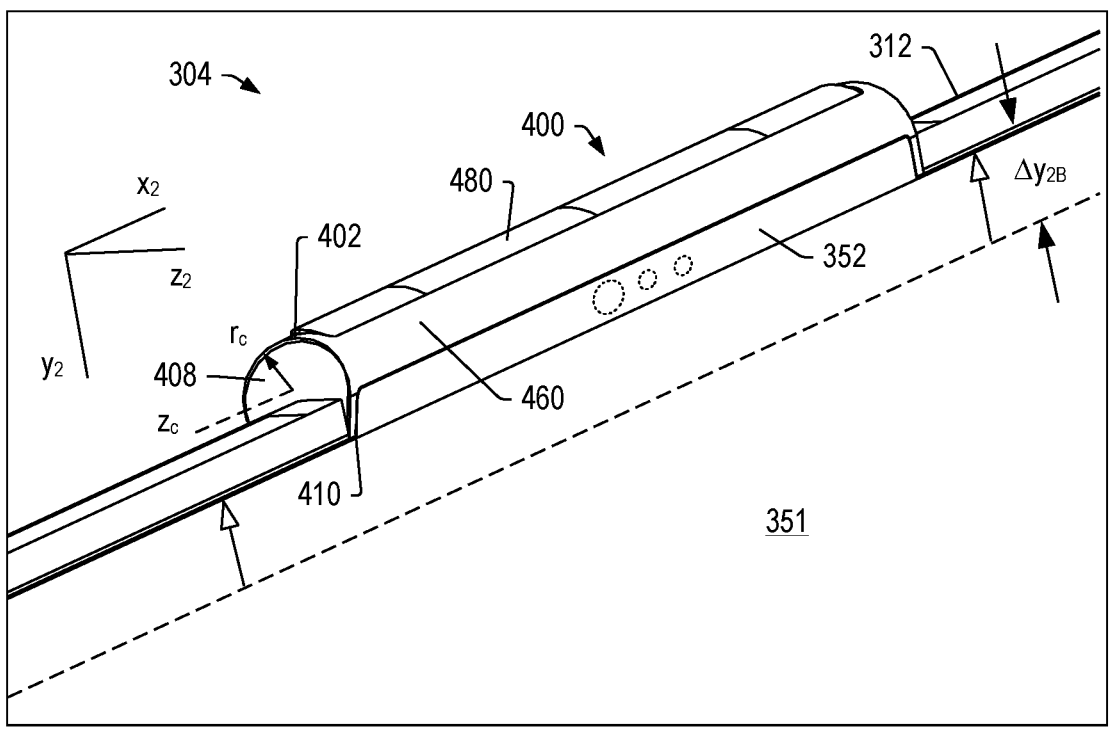

FIG. 4A and FIG. 4B show perspective views of the camera assembly 400 from a back side of the display housing 304 and from a front side of the display housing 304, respectively.

As an example, the camera assembly 400 may be a grip. For example, consider utilizing the camera assembly 400 as a grip for transitioning a clamshell computing device from a closed orientation to an open orientation (e.g., where a user can contact the camera assembly 400 to rotate a display housing away from a keyboard housing). In such an example, the user may apply force to the camera assembly 400 rather than applying force to a bezel region of a display housing, which may help to reduce stress experienced by a display panel (e.g., to prevent damage to the display panel, increase life of the display panel, etc.).

As explained, a thin display housing may include a thin bezel region which may experience stress, strain, torque, etc., if it is used as a grip for transitioning a clamshell computing device from a closed orientation to an open orientation or vice versa. As an example, a camera assembly may be made of a sufficiently rigid material that may help to distribute stress, force, torque, etc., to a larger area of a display housing if a user utilizes the camera assembly as a grip.

As an example, a display housing may include a rigid support member that extends to a camera assembly that includes a rigid metallic structure (e.g., a metal, an alloy, a composite, etc.) where the support member may help to improve rigidity of the display housing. In such an example, consider a rigid support member that may extend to a hinge assembly or hinge assemblies. In such an example, the camera assembly may function as a grip for opening and closing the display housing with respect to another housing such as a keyboard housing where a risk of distorting a display panel of the display housing may be reduced during such opening or closing transitions.

As explained, a clamshell computing device may include a single hinge or multiple hinges, if a user grips a corner of a display housing to transition it from closed to open, or vice versa, a display panel may experience twisting, which may damage relatively delicate components, circuitry, etc. (e.g., LED, LCD, etc., types of components). A centralized camera assembly may provide for more robust transitioning in a manner that helps to maintain stress, force, torque, etc., particularly with respect to one or more hinges.

As shown in the example of FIG. 4A and FIG. 4B, the camera assembly 400 can include a top side 402, a bottom edge 404, opposing sides 406 and 408, the recess 410 that receives the portion 352 of the cover material 351, the portion 450 that extends outwardly from a back surface 381 of the display housing 304 (opposite the cover material side), and an upper surface 460 at the top side 402 that extends beyond the edge 312 and that includes an actuatable button 480. In the example of FIG. 4A and FIG. 4B, the upper surface 460 is curved and may be defined in part via one or more radii (see, e.g., the radius $r_c$), which may be defined with respect to an axis $z_c$, which may be a distance from the edge 312 of the display housing 304. As shown in FIG. 4B, one or more camera related features (e.g., apertures, lenses, etc.) can be disposed behind the cover material 351 such that the cover material 351 is an unbroken plane with the portion 352 thereof received in the recess 410. In such an example, the front of the display housing 304 can be relatively flush in that a camera does not stick forwardly outwardly from the plane of the cover material 351. In such an example, a bezel may be made thinner and/or a display surface may be made larger as various camera components are disposed within the camera assembly 400. In the example of FIG. 4A, dimensions $\Delta x_{2c}$ and $\Delta y_{2c}$ are shown (see also, e.g., the dimension $\Delta x_{ca}$ of the example of FIG. 3, which may be approximately equal to the dimension $\Delta x_{2c}$).

In the example of FIG. 4B, a camera can be included without a forward bump out for a camera aperture. In such an example, the cover material 351 may be a single piece of glass, which may be surrounded at least in part by a relatively thin bezel. As shown, the camera assembly 400 can utilize a backward bump out and a topward bump out where the camera assembly 400 does not disturb a display surface of the display housing 304, which may be with a relatively unaffected, relatively thin dark (e.g., black) boarder. As mentioned, the camera assembly 400 may also include face lighting, which may be spaced a distance from an edge of a display surface.

As shown in the example of FIG. 4B, a viewable region of a display panel may be indicated by a dashed line where it may be defined by a dimension $\Delta y_{2B}$. The dashed line, as shown in FIG. 4B, may correspond to an approach that can accommodate one or more cameras without a bump out. However, with a camera assembly such as the camera assembly 400, the dimension $\Delta y_{2B}$ can be reduced, optionally being reduced to zero or approximately zero (e.g., consider less than 1 cm or less than 0.5 cm), as indicated by open headed arrows. As explained, a display housing may be made thinner when a bumped out camera assembly is utilized (e.g., as to regions other than those for the bumped out the camera assembly). In various examples, a protective layer can be manufactured with an extended region such that the extended region extends beyond a viewable display panel region to provide protection for one or more cameras, etc. As explained, a camera assembly can include a recess such that the camera assembly forms a protective border about a protective layer. In such an example, the protective border may be approximately flush with an outer surface of the protective layer (e.g., relatively smooth to dragging a finger across the protective layer and the protective border). As an example, a display housing can include a protective border that can define a recess for seating a protective layer where the protective border of the display housing may be approximately flush with an outer surface of the protective layer. As explained, a camera assembly may be utilized in a manner that can free up space to increase a viewable region of a display panel and/or that can make an outer dimension or outer dimensions smaller (e.g., by moving a camera aperture outwardly to a border region, etc.).

As an example, a display panel can be covered by a cover material that is a protective material that can be in the form of a protective layer. In such an example, the cover material may extend beyond an edge or edges of the display panel such that a bezel region exists underneath a portion of the cover material. As an example, a display housing can include a frame that may form a recess into which a cover material may be positioned and where the cover material may be a protective layer for a display panel that may be adhered to the cover material. In such an example, one or more edges of the display panel may not extend to one or more corresponding edges of the cover material such that one or more bezel regions are formed. In such an example, a top bezel region may be demarcated by a blacked out backing on the cover material (e.g., a black paint, etc.). Where a camera is present within the boundary of the frame, the cover material may include a clear region within the blacked out region that allows light to pass through the cover material to the camera (e.g., a clear region that aligns substantially with an aperture of the camera). Where a microphone is present, a hole may exist in the cover material such that sound can reach the microphone. Where more than one camera is present, multiple clear regions may exist (e.g., small circular clear regions). As explained, the camera assembly 400 can allow for a bigger display panel region where cover material may be continuous and extend outwardly into a recess of the camera assembly 400 with one or more clear regions (e.g., see through regions that align substantially with a camera aperture, etc.) and/or one or more holes if a microphone or microphones are present. As mentioned, a microphone may be included in a camera assembly where an opening for the microphone is not within an area of a recess that receives a cover material (e.g., as a protective layer). In such an example, a cover material (e.g., a protective layer) may be without a hole or holes.

As mentioned, a cover material (e.g., a protective layer) can be made of glass. For example, consider an alkali-aluminosilicate sheet glass such as one or more of the glasses marketed as GORILLA glass. Such glass may be toughened by ion exchange. For example, material may be immersed in a molten alkaline potassium salt at a temperature of approximately 400 degrees C. where smaller sodium ions in the glass are replaced by larger potassium ions from the salt bath. In such an approach, the larger ions can occupy more volume and thereby create a surface layer of high residual compressive stress, giving the glass surface increased strength, ability to contain flaws, and overall crack-resistance, making it more resistant to damage.

As an example, glass may be of a particular thickness (e.g., 0.1 mm, 0.3 mm, 0.4 mm, 0.5 mm, 0.55 mm, 0.7 mm, 0.8 mm, 1 mm, 1.1 mm, 1.5 mm, 2 mm, etc.) and may optionally be machined to a particular shape (e.g., mechanical, laser, etc.). As an example, a depth of a recess of a camera assembly that can receive glass or other cover material may be approximately the same as the thickness of the glass or other cover material. As an example, one or more holes may be made in glass. For example, consider machine and/or laser drilling where a hole may be of a diameter of approximately 0.05 mm or more.

As an example, a single piece of glass may be utilized that can include an extended portion or two pieces of cover material may be utilized that form a protective layer. For example, consider an inset piece of cover material that may be set into a recess of a camera assembly where it may abut an edge of another piece of cover material that covers a display panel such that the two pieces can form a protective layer. In such an example, the two pieces may be bonded or otherwise tightly fit such that a gap does not exist, which may otherwise collect debris, etc. Depending on the approach to bonding (e.g., bonding approach, bonding material, etc.), a viewer may not be able to readily discern an interface between the two pieces such that a protective layer appears uninterrupted. As an example, a bonding material may be releasable upon application of a solvent, heat, etc. For example, where a bond is formed between a camera assembly and a protective layer, the bond may be releasable to service the camera assembly (e.g., for removal, repair, replacement, etc.).

Figure 5A:
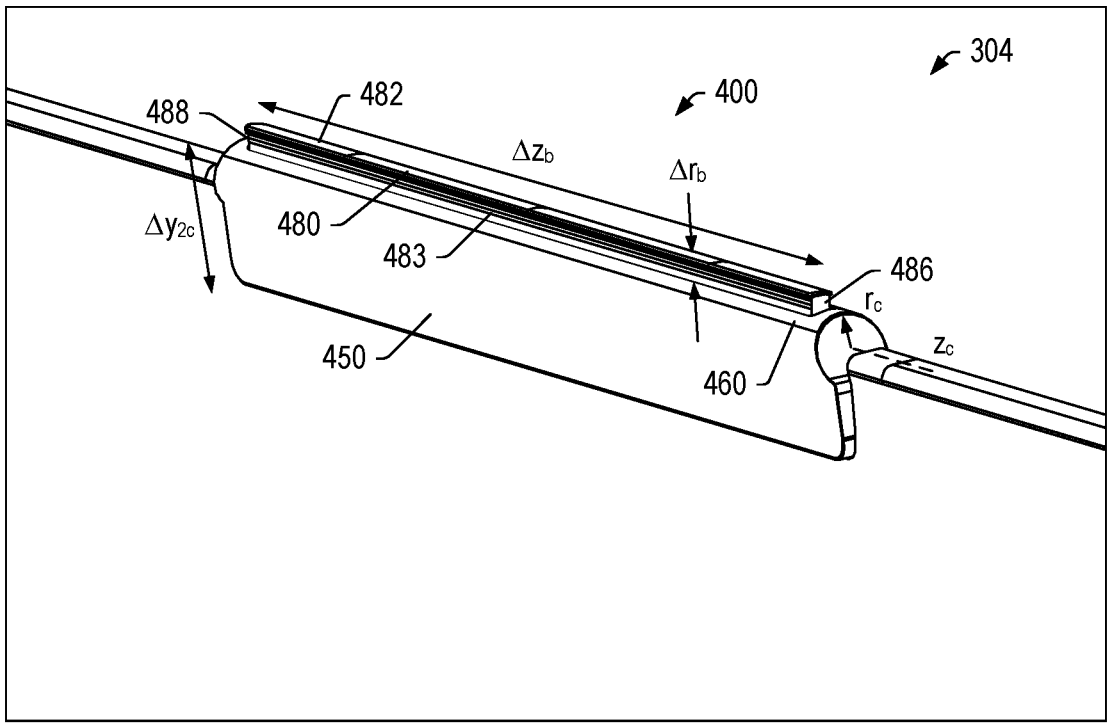
FIG. 5A and FIG. 5B are perspective views of an example of a housing and a camera assembly.
Figure 5B:
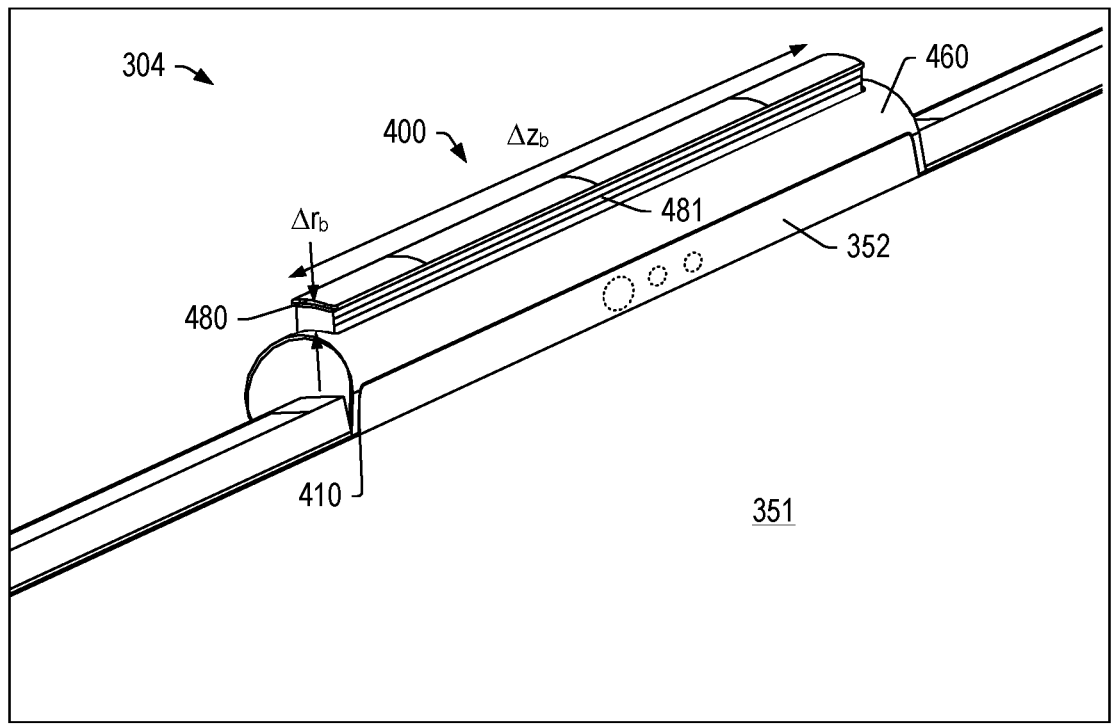

FIG. 5A and FIG. 5B show perspective views of the camera assembly 400 and portions of the display housing 304 where the actuatable button 480 has been actuated, for example, to extend outwardly from the upper surface 460. As shown, the distance by which the button 480 extends outwardly from the upper surface 460 may be defined using a radius as indicating by a radial dimension $\Delta r_b$ where the button 480 may have a length $\Delta z_b$ (e.g., consider a dimension along the axis $z_c$). Also shown is the dimension $\Delta y_{2c}$, which defines a height from the bottom of the portion 450 to the top 402. As an example, a portion of a camera assembly may be defined using one or more types of coordinate systems. For example, consider a cylindrical coordinate system with a z-axis along $z_c$.

As mentioned, the camera assembly 400 can include one or more of face lighting and status lighting. As shown in FIG. 5A, a status light 483 can be visible with the button 480 in the actuated, extended state. As shown in FIG. 5B, a face light 481 can be visible with the button 480 in the actuated, extended state. As to actuation of the face light 481 and/or the status light 483, one or more mechanisms may be utilized, which can include circuitry and/or mechanical components. For example, consider an electrical switch that causes the face light 481 and/or the status light 483 to illuminate once the button 480 is actuated and/or circuitry that causes the face light 481 and/or the status light 483 to illuminate responsive to a signal from a video call/video conferencing application.

The notebook camera interface design proposed in this disclosure offers a solution for the camera to be thicker than the cover of the notebook by simply bumping out the component in the z and y axis. As shown, a camera assembly can break a line along a top boarder of a display housing where the line may correspond to a relatively thin boarder around a display of the display housing. In such an example, the display does not demand an artificially thickened boarder to accommodate the camera assembly. For example, a chassis or frame of a display housing (e.g., of a tablet or a clamshell computer) may grows in height to allow for a camera to be higher. Such growth can also be designed to allow for easy opening of a clamshell device (e.g., transitioning from a closed orientation to an open orientation). On a camera assembly bump out, a shutter may be accommodated, which may be a physical and/or an electrical shutter that can allow for use of a camera or prohibition of use of the camera (e.g., an air gap switch, a physical object that obstructs an aperture of a camera, etc.).

As mentioned, a camera assembly can include a button that can operate via a push-push mechanism, which may provide for activation and/or deactivation of one or more components (e.g., electronic, physical, etc.).

Figure 6A:
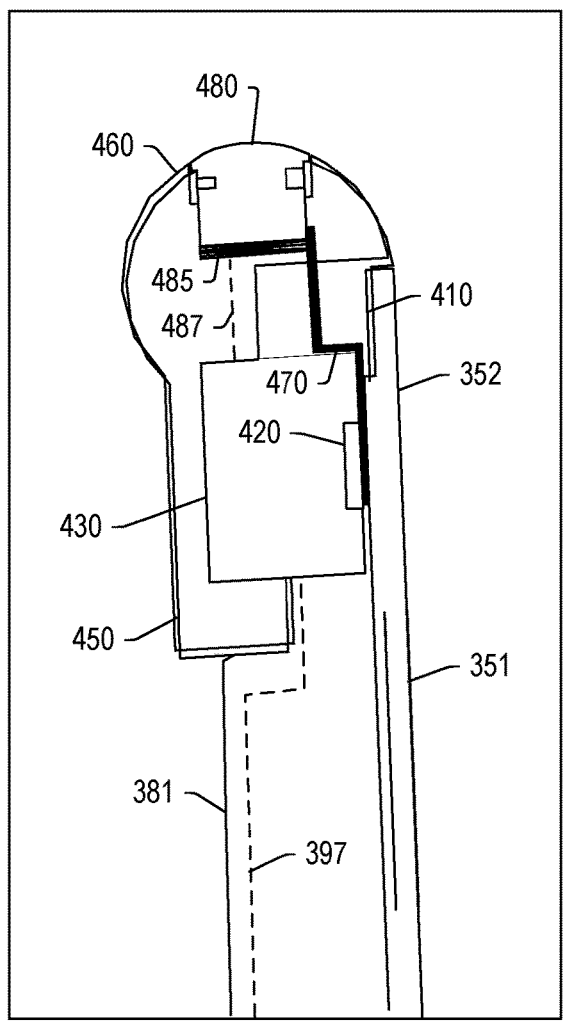
FIG. 6A and FIG. 6B are cross-sectional, cutaway views of a portion of an example of a housing and a camera assembly.
Figure 6B:
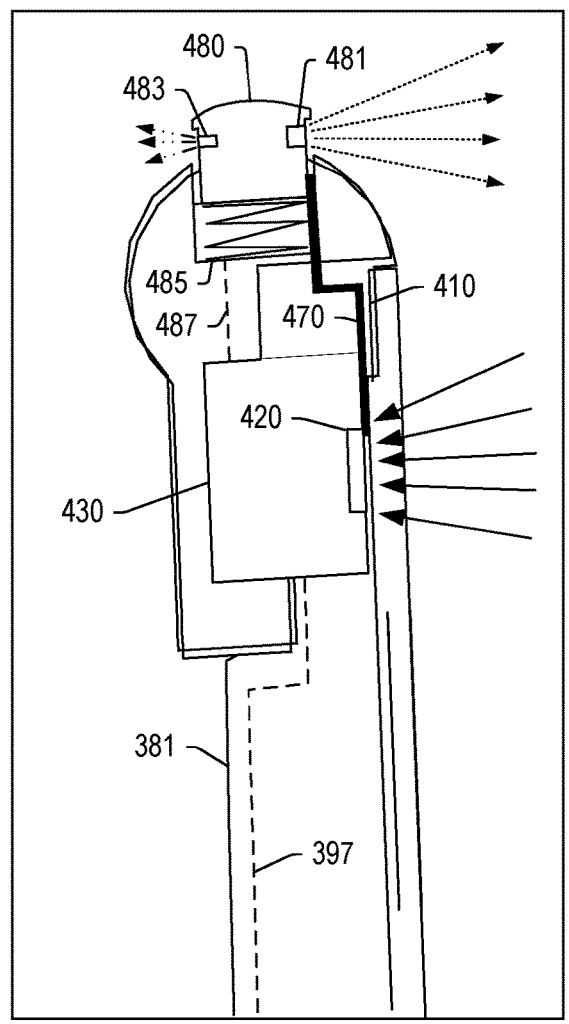

FIG. 6A and FIG. 6B show approximate cross-sectional views of an example of the camera assembly 400 as including the camera lens 420, the camera unit 430, and the button

480. In FIG. 6A, the button 480 is in a recessed position and, in FIG. 6B, the button 480 is in an extended or popped-out position.

As shown, the cover material 351 can include the portion 352 disposed at least in part in the recess 410 where the cover material 351 covers the camera lens 420 of the camera unit 430. As indicated by dashed lines, various circuits may be included 487 and 397, which can provide for transmission of power and/or data.

In the example of FIG. 6A and FIG. 6B, a push-push sub-assembly includes a spring 485 that may bias the button 480. As an example, a physical shutter 470 may move with the button 480 such that it can cover the camera lens 420 and expose the camera lens 420.

Figure 7A:
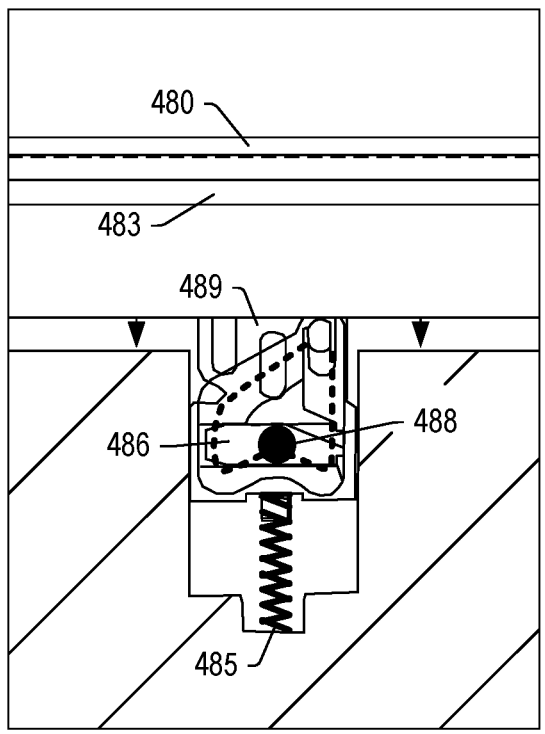
FIG. 7A and FIG. 7B are cross-sectional, cutaway views of a portion of an example of a housing and a camera assembly.
Figure 7B:
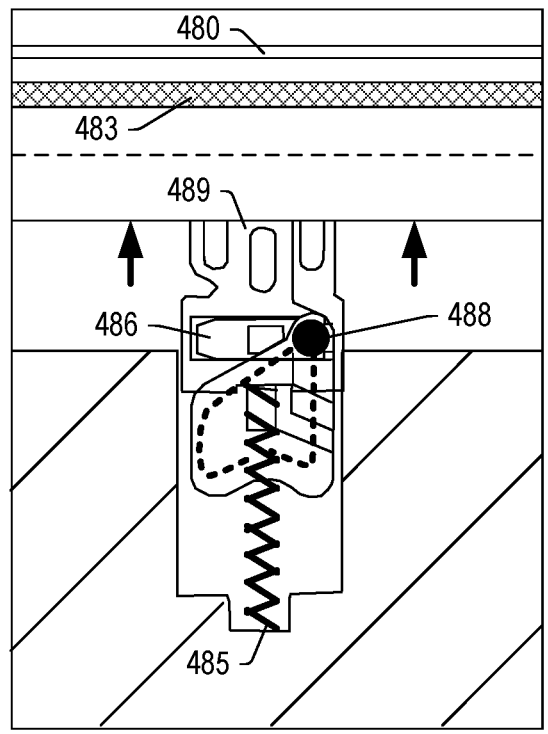

FIG. 7A and FIG. 7B show an example of the push-push sub-assembly as including the spring 485, another spring 486, a ball 488 and a carrier 489; noting that one or more push-push sub-assemblies may be included in a camera assembly. As shown, the ball 488 can move along a path between two positions that may be biased using the spring 486. As shown, the button 480 may be pushed inwardly to cause the ball 488 to move from a locked position downwardly in the path where the spring 485 causes the carrier 489 to carry the ball 488 upwardly in the path to lock into an open position. In the open position of FIG. 7B, the light 483 is visible and may, for example, be automatically actuated upon transitioning from the state of FIG. 7A to the state of FIG. 7B. As an example, a display housing may include a latch that may prohibit transitioning of the button 480. For example, the button 480 may be transitionable only in an open orientation of a clamshell computing device. As an example, the button 480 may be transitionable in a closed orientation and/or in an open orientation of a display housing of a clamshell computing device.

As an example, a user may push the button 480 on a bumped out camera assembly to close or open the shutter 470, which may in turn show an indicator (e.g., a front side indicator such as a small red dot, etc.) to notify the user that the camera lens 420 is either covered or uncovered (e.g., or vice versa).

As explained, the light 483 can be a meeting status light. For example, such a light can allow for a non-user or passerby to see that a user is in a call or not in a call. As explained, the light 481 can be a face light that can be illuminated when the camera 430 is in use (e.g., a "beauty light") where the light 481 can provide for facial lighting to improve a viewing of the user's face during a video meeting.

As an example, a camera assembly can include one or more types of features. For example, consider an array of cameras, a super high fidelity camera, a thick camera, etc., that can be part of a bumped out feature from a top and A cover chassis to allow for the camera not to impact a black boarder/bezel of a display housing.

Figure 8:
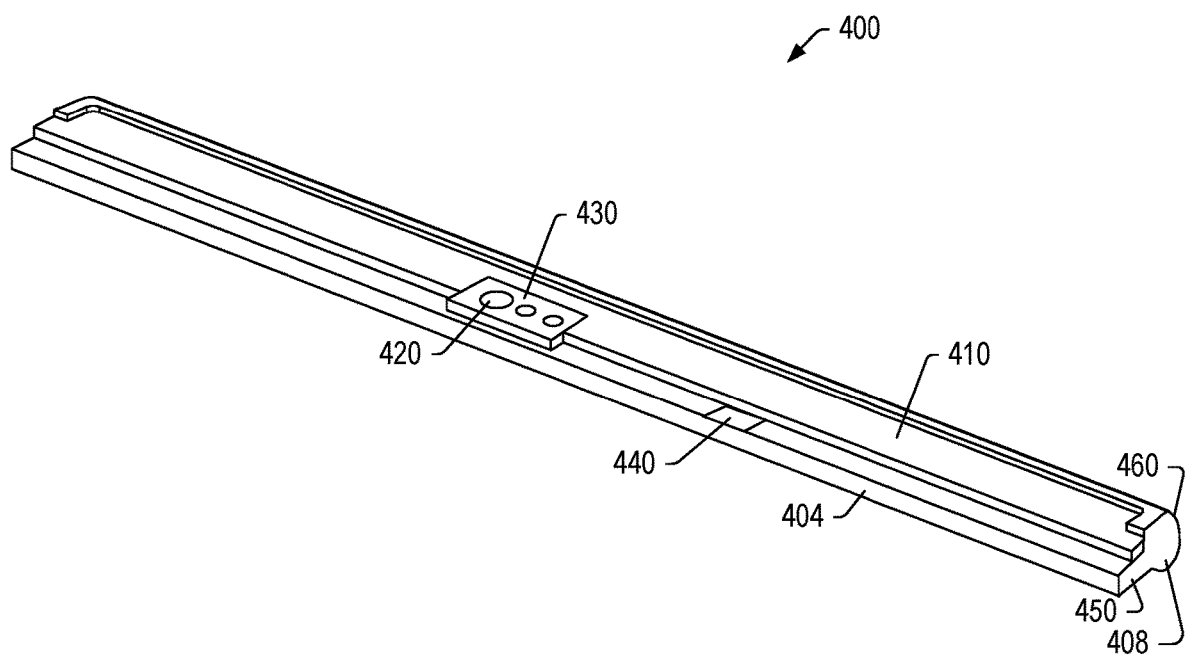
FIG. 8 is a perspective view of an example of a camera assembly.

FIG. 8 shows a perspective view of the camera assembly 400 as including the lower edge 404, the side 408, the recess 410, the camera lens 420, the camera unit 430, an interface 440 and the upper surface 460. As an example, the interface 440 may provide for transmission of power and/or data, for example, for the camera unit 430 and/or one or more other types of circuitry (e.g., the light 481, the light 483, etc.).

As an example, the camera assembly 400 may include one or more speakers. For example, consider a speaker that may have an opening or openings at the side 406 and another speaker that may have an opening or openings at the opposing side 408. As mentioned, the camera assembly 400 may include one or more microphones, which may be provided with one or more corresponding openings for sound. As an example, a camera assembly may include features for video capture (e.g., via a camera), audio capture (e.g., via a microphone) and audio rendering (e.g., via a speaker) where such a camera assembly may be suitable for use in videoconferencing along with a display (e.g., for video rendering).

Figure 9:
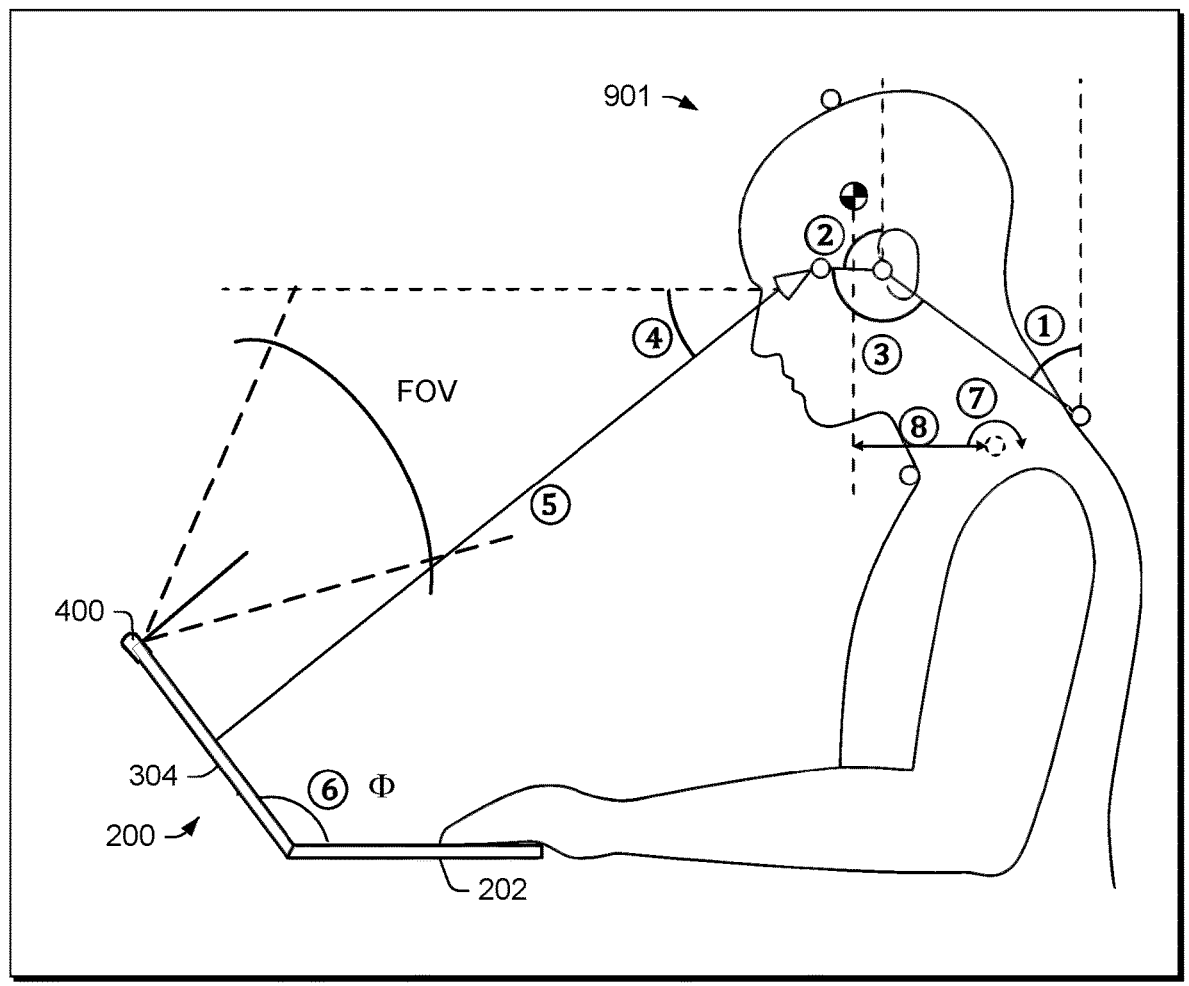
FIG. 9 is a diagram of an example of a user and an example of a computing device that includes a camera assembly.

FIG. 9 shows an example of a user 901 and the system 200 with the housings 202 and 304 and the camera assembly 400, along with various references to angles, distances, etc., which may be considered to be variables, including a neck flexion angle (1), a head flexion angle (2), a cranio-cervical angle (3), a gaze angle (4), a gaze distance (5), a laptop tilt angle (6) or $\Phi$, a gravitational moment on the neck (7), and a gravitational moment-arm of the neck (8). The variables are described in an article of Ailneni et al., Influence of the wearable posture correction sensor on head and neck posture: Sitting and standing workstations (Work, 62. 27-35, 10.3233/WOR-182839, 2019), which is incorporated herein by reference.

In the example of FIG. 9, the camera assembly 400 can include a field of view or fields of view (FOV) that may be suitable to capture imagery of the user's face where the light 481 may help to illuminate the user's face. In such an example, the light 483 may be illuminated to notify one or more others that the user 901 is in a conference call with video. As an example, a camera aperture may define at least in part a field of view (FOV). In optics, an aperture may be defined as a region through which light travels (e.g., through a transparent material, through a hole, etc.). As an example, an aperture may refer to an opening of a lens's diaphragm through which light passes.

Figure 10:
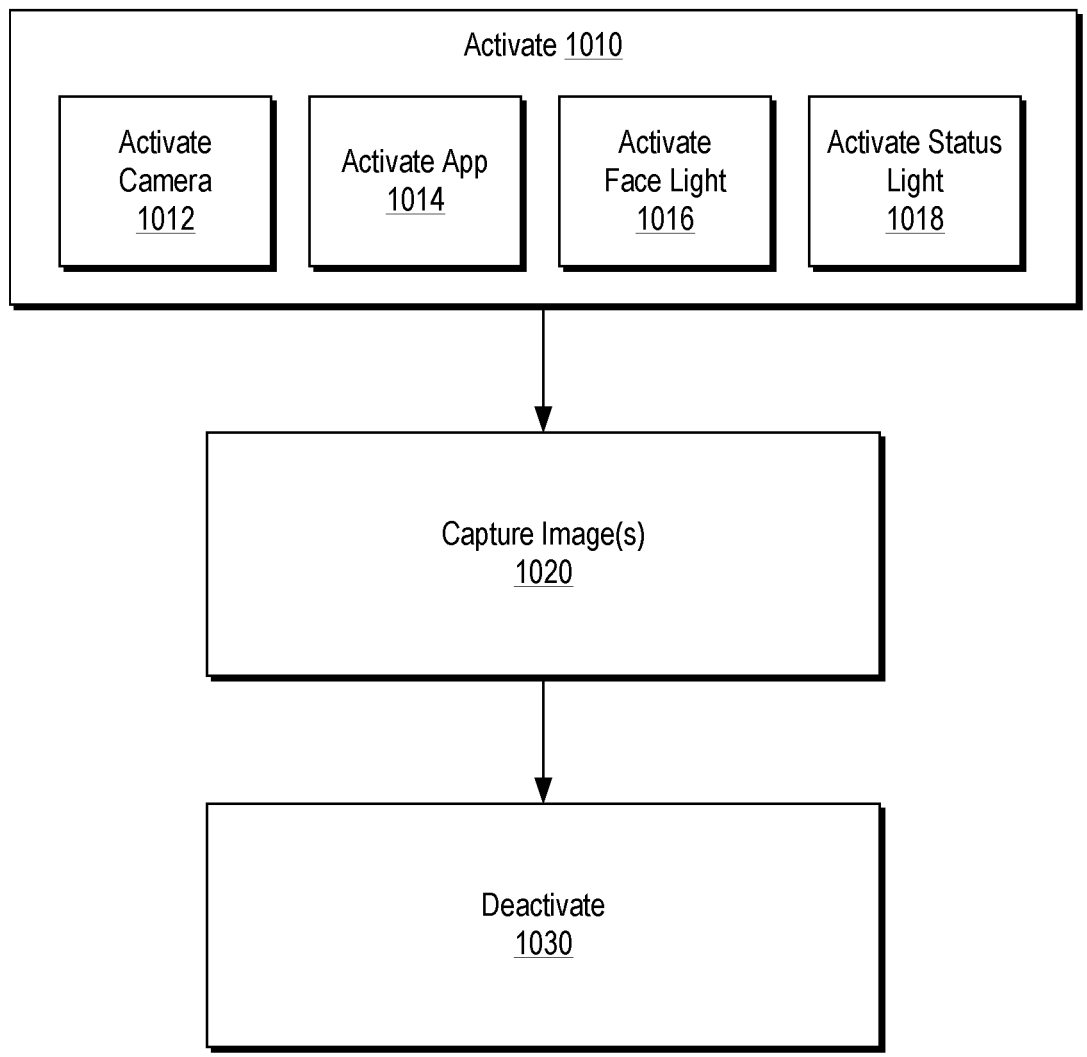
FIG. 10 is a block diagram of an example of a method.

FIG. 10 shows an example of a method 1000 that includes an activate block 1010 for activating circuitry, a capture block 1020 for capturing images and a deactivation block 1030 for deactivating circuitry.

In the example of FIG. 10, the activation block 1010 can include a activate camera block 1012, an activate application block 1014, an activate face light block 1016, and an activate status light block 1018 and/or, for example, one or more other activate blocks.

As an example, activation may occur responsive to activation of one or more of a button, a camera, an application, a hinge, etc. For example, consider a system that receives an instruction to activate a camera. In such an example, the instruction may be responsive to activation of an application, which may include instantiation of an instance of the application, bringing the application forward in a stack of applications, interacting with the application, etc. As to a hinge activation approach, upon detection of a rotational orientation of a housing with respect to another housing. As explained, button-based activation can occur responsive to a transition of a button from one state to another state.

In the example of FIG. 10, the method 1000 may include making one or more application programming interface (API) calls. For example, upon launching of the videoconferencing application, an API call may be made that wakes up (e.g., activates) circuitry, which can include circuitry pertain to a camera for capturing images for transmission in a videoconferencing session, lighting, a microphone, etc.

Figure 11:
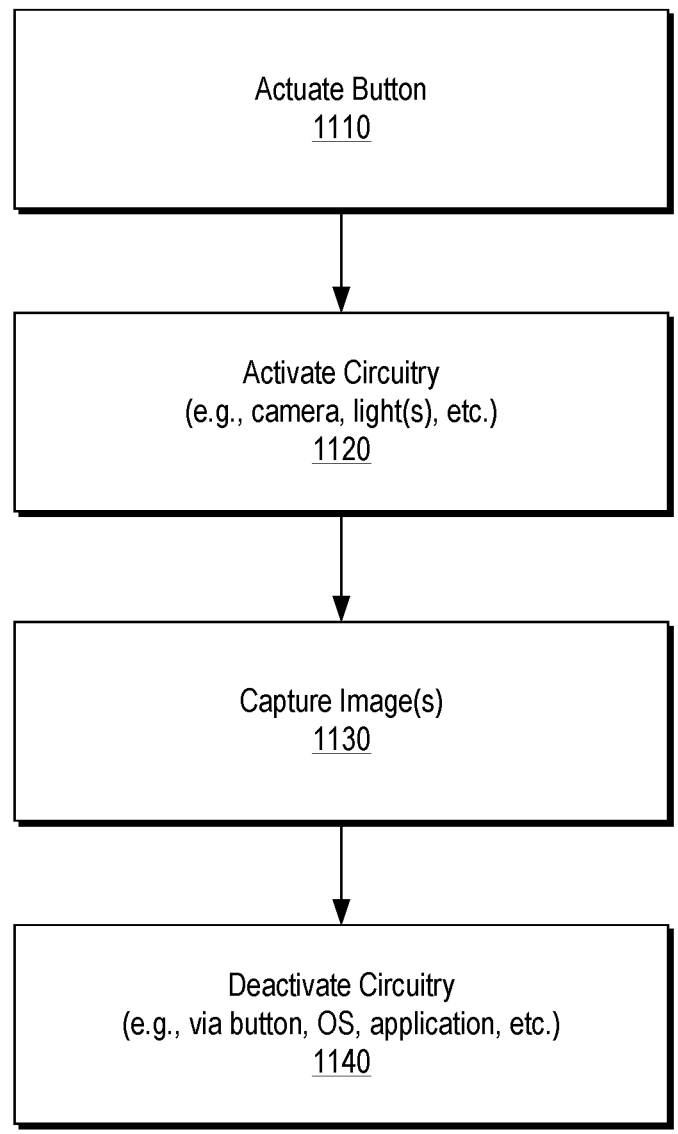
FIG. 11 is a block diagram of an example of a method.

FIG. 11 shows an example of a method 1100 that includes an actuation block 1110 for actuating a button, an activation block 1120 for activating circuitry, a capture block 1130 for capturing images and a deactivation block 1140 for deactivating circuitry.

As an example, a computing device can include a processor; memory accessible to the processor; a display panel operatively coupled to the processor; a housing that includes a protective layer that covers the display panel; and a camera assembly mounted to an edge of the housing, where the camera assembly includes a camera, a camera aperture and a recess, where the protective layer covers the camera aperture and extends into the recess. In such an example, the camera assembly can include one or more lights. For example, consider a face light (e.g., a beauty light) that may enhance a user's experience during a videoconference and/or that may assist a user in a "mirror" mode where the camera is utilized to generate images of a user's face as may be illuminated by the face light (e.g., for application of make-up, adjusting a contact lens, examining a blemish, etc.). As an example, a face light may span a length greater than approximately 20 percent of a length of a camera assembly, for example, via a continuous element or via discrete elements. As an example, a camera assembly may include a camera flash that can be a strobe light, optionally with red-eye reduction features, etc. As an example, a camera assembly can include one or more status lights. For example, consider a status light that can provide an indication of a status of a videoconference call, session, etc. As an example, a camera assembly can include a face light on one side and a status light on an opposing side. As an example, when a videoconferencing application is not executing or otherwise to be launched or operatively coupled to camera acquired images for purposes of videoconferencing, a feature of a camera assembly may be actuated for entering a mirror mode, which, as explained, can effectively turn a display into a mirror such that a user may see her face where, for example, a face light can be illuminated at a desired level of brightness. As mentioned, a surface of a camera assembly may be touch sensitive such that it may be utilized for making one or more adjustments. In such an example, consider a top surface of a button of a camera assembly becoming active once the button is popped out such that a touch and/or a touch and slide gesture may be utilized to control brightness of a face light. In such an example, the brightness adjustment may be utilized for videoconferencing and/or for a mirror mode. As to the latter, if the user gets something in his eye, he may increase the brightness of the face light and approach the display panel while being able to see a rendered image of his eye on the display panel; noting that some amount of offset may occur between the camera and the display panel as the mirror mode mimics a mirror rather than creates an actual mirror. In various instances, a display panel may include a mirror mode that causes the display panel to have a highly reflective surface akin to an actual mirror, which may depend on characteristics of cover material, etc. In such an example, a face light (e.g., a button-based face light) may be utilized to help illuminate a user's face.

As an example, a computing device can include a camera assembly that has a length that is greater than 10 percent of a length of the edge of the housing and a thickness that is greater than a thickness of the housing.

As an example, a computing device can include a camera assembly that includes a mechanical button where, for example, a camera aperture shutter is operatively coupled to the mechanical button (e.g., moves responsive to movement of the mechanical button). As an example, a mechanical button of a camera assembly may be utilized to actuate a camera or cameras (e.g., consider dual front facing cameras that can capture stereoscopic images, etc.). As mentioned, a camera assembly can include a face light that is actuated by a mechanical button and/or a status light that is actuated by a mechanical button.

As an example, a mechanical button can include a face light on one side and a status light on an opposing side. In such an example, in an extended position of the mechanical button, the face light and the status light can be exposed and, in a seated position of the mechanical button, the face light and the status light can be hidden (e.g., and protected).

As an example, a mechanical button of a camera assembly can be actuatable to supply electrical power to a camera of the camera assembly.

As an example, a computing device can include a controllable release operatively coupled to the mechanical button. For example, consider a controllable release that is operatively coupled to a processor to transition the mechanical button from a seated position to an extended position. In such an example, consider an application that may upon launching or other action cause the controllable release to transition the mechanical button, for example, to set up the computing device for videoconferencing, etc.

As an example, a camera assembly can include a spring where a mechanical button is biased by the spring. As an example, a mechanical button can be a push-push button.

As an example, a camera assembly can include one or more microphones. As an example, a camera assembly may include one or more speakers. As an example, a camera assembly may include features that enable video and audio capture and audio rendering, for example, for videoconferencing.

As an example, a computing device can include a housing that is a display housing and further include a keyboard housing and at least one hinge assembly that couples the keyboard housing and the display housing.

As an example, a method can include responsive to actuation of a push-push button of a camera assembly at an edge of a display housing, activating a face light. In such an example, the method may further include activating a camera of the camera assembly (e.g., responsive to the actuation of the push-push button). Yet further, a method may include activating a status light, where the face light is on one side of the camera assembly and the status light is on an opposing side of the camera assembly. In such an example, at least one of the face light and the status light can be on the push-push button.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 12:
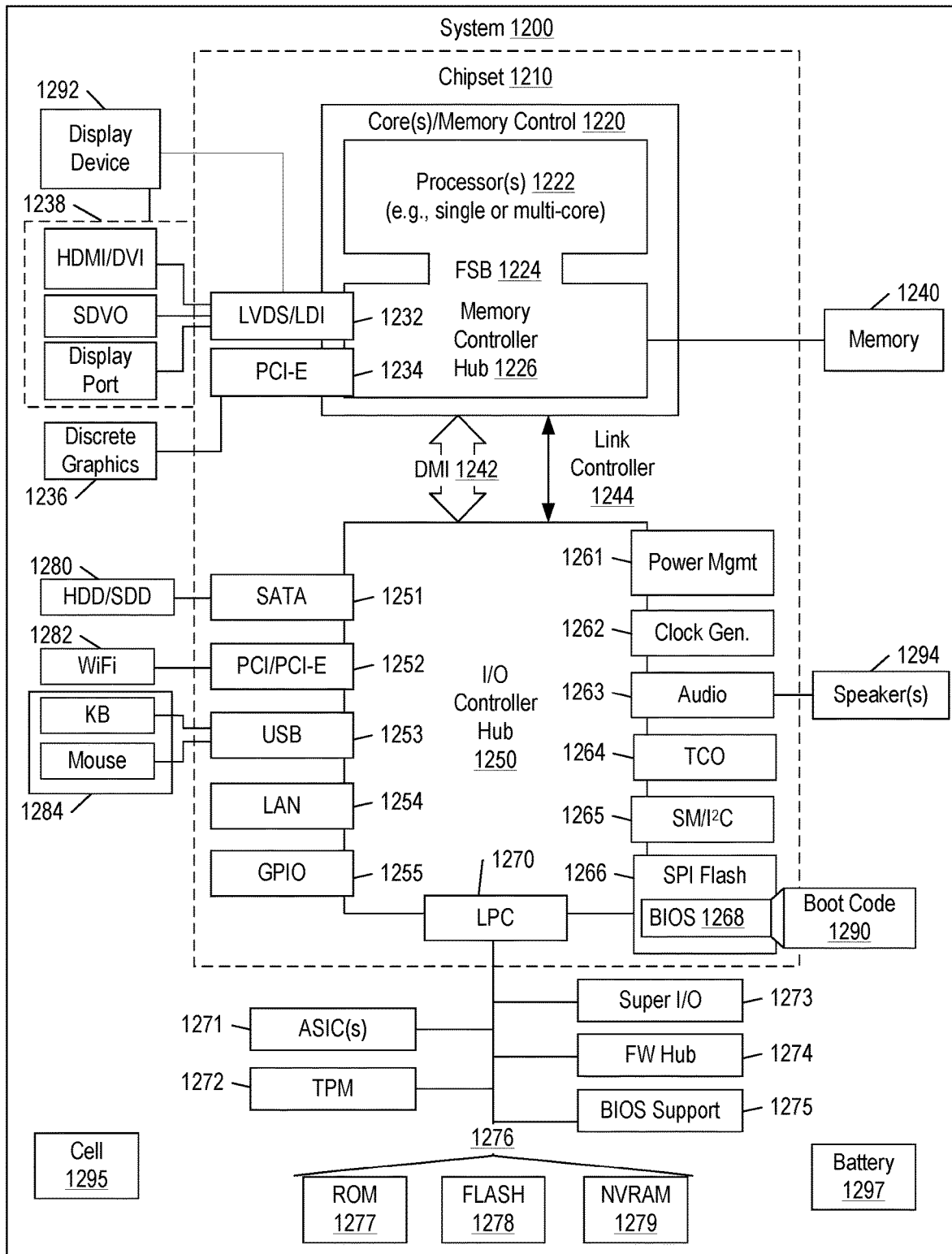
FIG. 12 is a diagram of an example of a system that includes one or more processors.

While various examples of circuits or circuitry have been discussed, FIG. 12 depicts a block diagram of an illustrative computer system 1200. The system 1200 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 1200. As an example, a system such as the computing device 100 of FIG. 1, the computing device or system 200 of FIGS. 2 and 3, etc., may include at least some of the features of the system 1200.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., $I^2C$, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an $I^2C$ interface (see, e.g., the SM/$I^2C$ interface 1265), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
   a processor;
   memory accessible to the processor;
   a display panel operatively coupled to the processor;
   a housing that comprises a protective layer that covers the display panel; and
   a camera assembly mounted to an edge of the housing, wherein the camera assembly comprises a camera, a camera aperture and a recess, wherein the protective layer covers the camera aperture and extends into the recess, wherein the camera assembly comprises a mechanical button, and wherein the mechanical button comprises a face light on one side and a status light on an opposing side.

2. The computing device of claim 1, wherein the camera assembly comprises a camera flash on the same side as the face light.

3. The computing device of claim 1, wherein the camera assembly comprises a length that is greater than 10 percent of a length of the edge of the housing and a thickness that is greater than a thickness of the housing to form a finger grip.

4. The computing device of claim 1, comprising a camera aperture shutter operatively coupled to the mechanical button.

5. The computing device of claim 1, wherein the mechanical button actuates the camera.

6. The computing device of claim 1, wherein the face light is actuated by the mechanical button.

7. The computing device of claim 1, wherein the status light is actuated by the mechanical button.

8. The computing device of claim 1, wherein, in an extended position of the mechanical button, the face light and the status light are exposed and wherein, in a seated position of the mechanical button, the face light and the status light are hidden.

9. The computing device of claim 1, wherein the mechanical button is actuatable to supply electrical power to the camera.

10. The computing device of claim 1, comprising a spring, wherein the mechanical button is biased by the spring.

11. The computing device of claim 1, wherein the camera assembly comprises at least one microphone.

12. The computing device of claim 1, wherein the housing is a display housing and further comprising a keyboard housing and at least one hinge assembly that couples the keyboard housing and the display housing.

13. A method comprising:
    responsive to actuation of a push-push button of a camera assembly at an edge of a display housing, activating a face light, activating a camera of the camera assembly, and activating a status light, wherein the face light is on one side of the camera assembly and the status light is on an opposing side of the camera assembly, wherein at least one of the face light and the status light is on the push-push button.

14. The computing device of claim 8, wherein a position of the camera aperture is fixed and covered by the protective layer, wherein a position of the face light is movable via the mechanical button, wherein a position of the status light is movable via the mechanical button, wherein the camera aperture and the face light face a common direction and wherein the status light faces an opposite direction.

15. The computing device of claim 1, wherein the status light is a backward directed status light that is not visible from a display side of the housing.

16. The computing device of claim 15, wherein the status light indicates execution of a video conferencing application by the computing device.

17. The computing device of claim 1, comprising a camera aperture shutter operatively coupled to the mechanical button that covers the camera aperture in a seated position of the mechanical button and that exposes the camera aperture in an extended position of the mechanical button.

18. The method of claim 13, wherein a position of the camera is fixed, wherein the face light and the status light are on the push-push button, wherein a position of the face light moves with the push-push button, wherein a position of the status light moves with the push-push button, wherein the camera and the face light face a common direction and wherein the status light faces an opposite direction.

* * * * *